United States Patent
Hushyar et al.

(10) Patent No.: US 8,763,007 B1
(45) Date of Patent: Jun. 24, 2014

(54) OPEN APPLICATION INTERFACE FOR COMPLEX SYSTEMS

(75) Inventors: Kaveh Hushyar, Saratoga, CA (US); Mostafa Tofighbakhsh, Cupertino, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2409 days.

(21) Appl. No.: 11/511,676

(22) Filed: Aug. 29, 2006

(51) Int. Cl.
*G06F 3/00* (2006.01)

(52) U.S. Cl.
USPC .......................... 719/313; 719/320; 719/331

(58) Field of Classification Search
None
See application file for complete search history.

(56) References Cited

U.S. PATENT DOCUMENTS

| | | | |
|---|---|---|---|
| 5,500,941 A | 3/1996 | Gil | |
| 5,715,461 A | 2/1998 | Yoshitomi | |
| 5,784,553 A | 7/1998 | Kolawa et al. | |
| 5,794,043 A | 8/1998 | Kolb | |
| 5,812,533 A * | 9/1998 | Cox et al. | 370/259 |
| 5,974,255 A | 10/1999 | Gossain et al. | |
| 6,023,580 A | 2/2000 | Sifter | |
| 6,219,829 B1 | 4/2001 | Sivakumar et al. | |
| 2004/0059703 A1* | 3/2004 | Chappell et al. | 707/1 |
| 2004/0215755 A1* | 10/2004 | O'Neill | 709/223 |

OTHER PUBLICATIONS

"Web services Conceptual Architecture WSCA 1.0)", Kreger, IBM Software Group, 2001, pp. 1-41.*

* cited by examiner

*Primary Examiner* — Tuan Dao
(74) *Attorney, Agent, or Firm* — Wolff & Samson, PC (57) ABSTRACT

A method and apparatus is disclosed for using an open application interface to enable communications between the components and sub-components of a complex system, such as an OSS system. In a first embodiment, one or more Intelligent Flow Engines (IFEs) are used to register all applications and/or components in the system. Once the applications have been registered, then a component requiring service from another application/component sends a request for service to an IFE. The IFE then determines which provider application can best provide the requested service and binds the requesting application with that provider application. In accordance with another embodiment, when a provider component is taken offline, e.g., for maintenance or to replace that component with a new or upgraded component, the applications of that component are un-registered and any applications that were bound to that component are seamlessly rerouted and are bound with another application if one is available.

18 Claims, 6 Drawing Sheets

OPEN APPLICATION INTERFACE FOR COMPLEX SYSTEMS

BACKGROUND OF THE INVENTION

The present invention relates to the exchange of message traffic between components in a network and, more particularly, to the exchange of messages between components of a complex system such as an operational support system in a communication network.

As complex converged telecommunication networks designed to provide a wide range of services to customers become more prevalent and grow in size, the need for ensuring the accurate exchange of information between the components of those systems becomes ever more important. For example, operational support systems (OSSs) in telecommunication systems have many different elements that require frequent updates and improvements when new services are introduced to customers. As used herein, the term Operational Support System is defined as a system performing support functions, such as order management, design and engineering, carrier interconnection, service provisioning, inventory, service activation, billing, customer care and service assurance functions for a telecommunication service provider and its associated networks. One skilled in the art will recognize that OSS systems may perform a variety of different functions.

Typically, in such OSSs, the components performing these functions are able to interact directly with each other and various other components and networks and also must be able to accept input from and provide information to external elements, such as sales, engineering and technician personnel. Accordingly, such systems are complex and require careful configuration control. Typically, such systems are designed with interfaces and data input/output designs tailored specifically to particular components and specific applications hosted by those components. Accordingly, inserting a new component of a system, such as a billing component or other component, or otherwise reconfiguring the network in any way to add or remove applications hosted by such components, is expensive due to the fact that such reconfiguration typically required complex integration activities to allow message traffic to flow between proprietary interfaces.

SUMMARY OF THE INVENTION

The present invention essentially solves the aforementioned problems. The present inventors have invented a method and apparatus for using an open application interface to enable communications between the components and subcomponents of a complex system, such as an OSS system. In a first embodiment, instead of configuring each component and application in an OSS to only communication with specific other components and applications, one or more Intelligent Flow Engines (IFEs) are used to register all applications and/or components. Once the applications have been registered, then a component requiring service from another application/component sends a request for service to an IFE. The IFE then determines which provider application at which component can best provide the requested service and binds the requesting application with that provider application. Communication between the two bound components can then begin. In accordance with another embodiment, when a provider component is taken offline, e.g., for maintenance or to replace that component with a new or upgraded component, the applications of that component are un-registered and any applications that were bound to that component are seamlessly rerouted and are bound with another application if one is available. In this way, one or more IFEs enable the flexible management of the links between the different components of an OSS.

These and other advantages of the invention will be apparent to those of ordinary skill in the art by reference to the following detailed description and the accompanying drawings.

DETAILED DESCRIPTION

Figure 1:
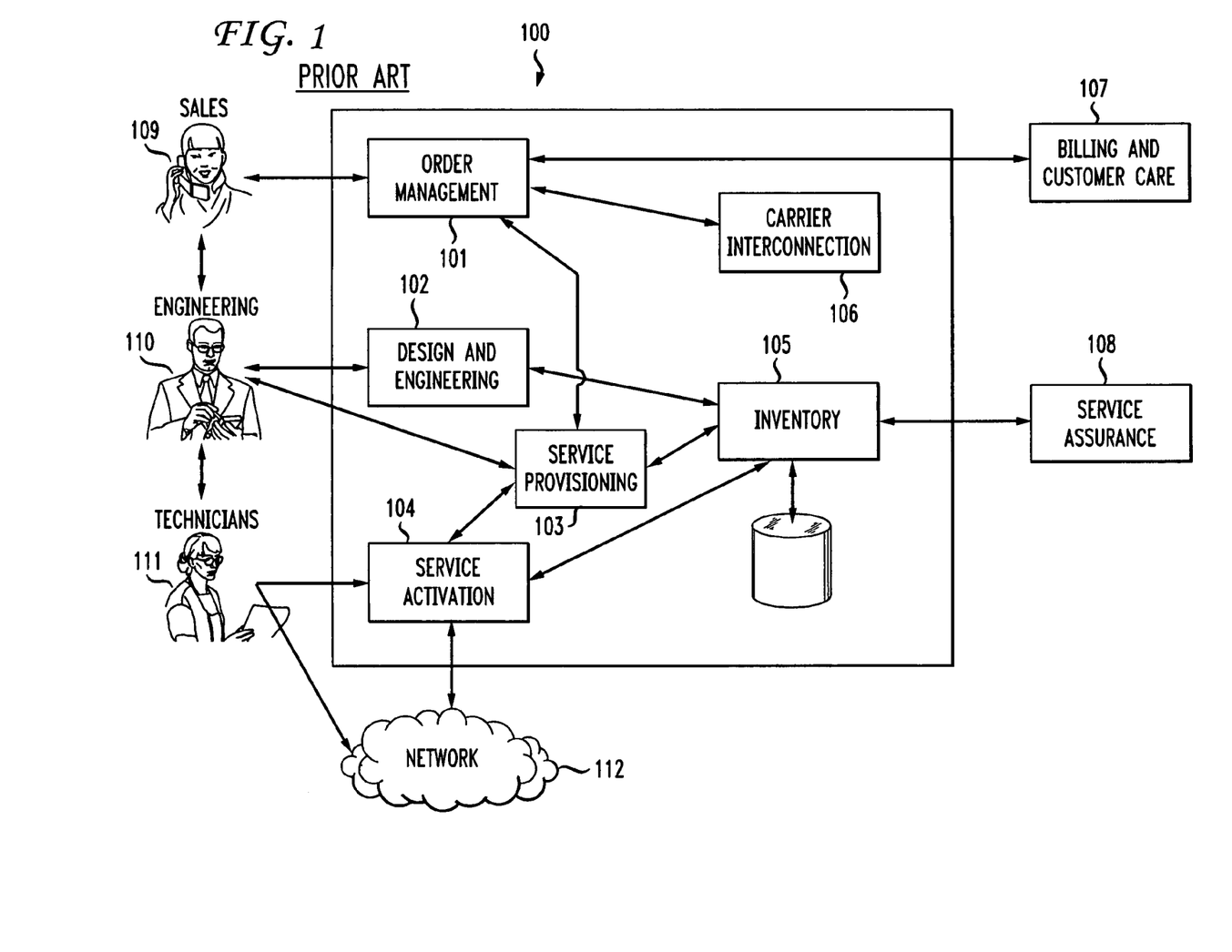
FIG. 1 shows an illustrative operational support system associated with a telecommunications network.

FIG. 1 shows an illustrative operational support system (OSS) associated with a telecommunication network. OSS 100 has, illustratively, order management component 101, design and engineering component 102, service provisioning component 103, service activation component 104, inventory component 105, carrier interconnection component 106, billing component 107 and service assurance component 108. Illustratively, sales departments/personnel 109 input information (e.g., sales) to the order management component 101 and provide feedback (e.g., requests for improvement to the system) to engineering department 110. Engineering department 110, for example, performs system design and engineering functions using design and engineering component 105; performs service provisioning using service provisioning component 103 and communicates activation and network configuration requirements to technicians 111. Technicians 111 perform the actual service activation functions and configure 112 according to system requirements such as those determined to be necessary by engineering department 110.

Figure 2:
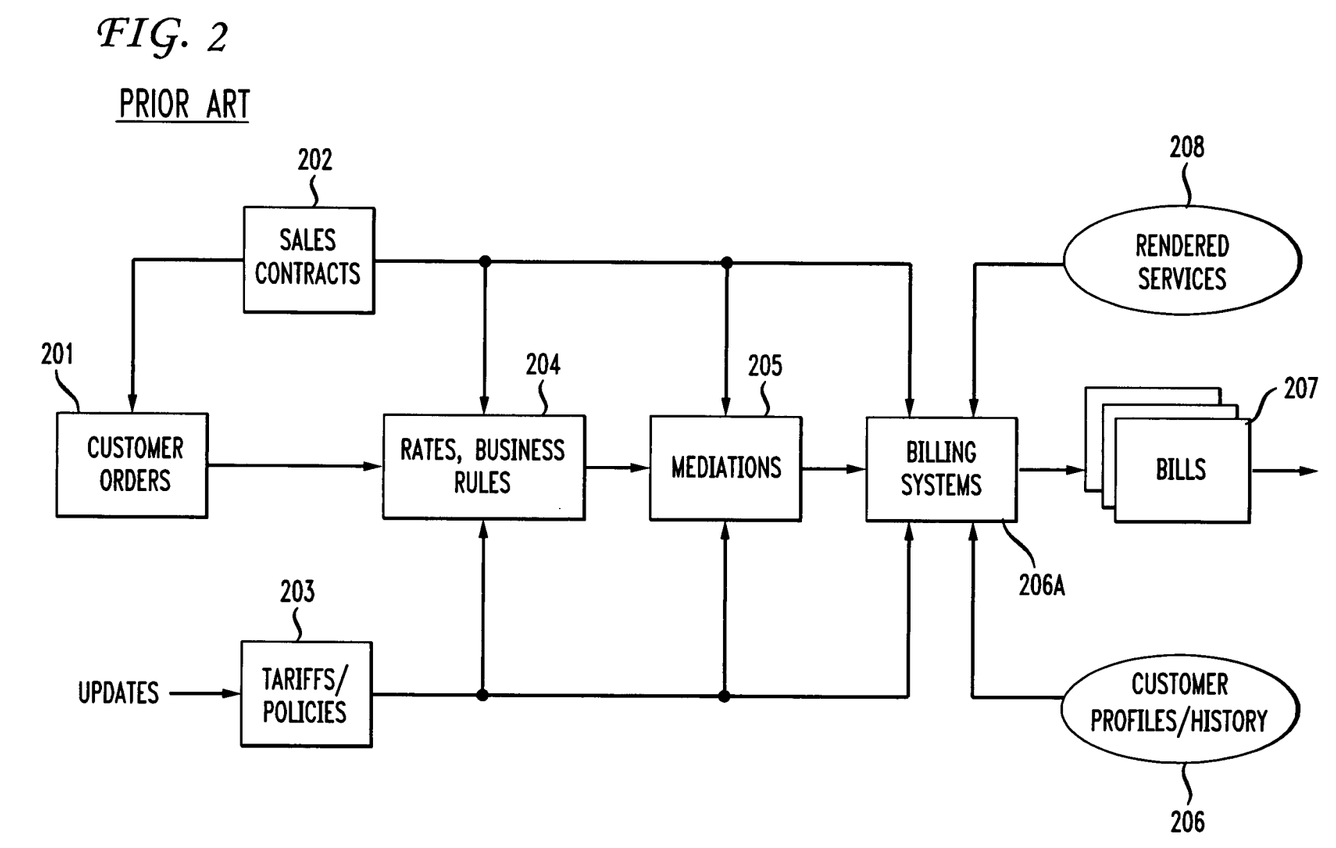
FIG. 2 shows an illustrative billing system within the operational support system of FIG. 1.

One skilled in the art will recognize that the different components of the OSS of FIG. 1 are typically legacy systems that may have been in operation for a significant period of time. Each component in the system has, illustratively, multiple subcomponents each consisting of software applications to perform the functionality of those subcomponents. As one skilled in the art will recognize, each of these components or subcomponents may have been added or updated independently from other elements of the system and may have been developed by different suppliers. FIG. 2 shows one illustrative functional component of the system of FIG. 1, specifically billing component 107, showing the various subcomponents and aspects of the functionality of the billing component. Referring to FIG. 2, in operations of the billing component, customer orders 201 are received and sales contracts 202 are generated. These customer orders 201 and sales contracts 202, together with tariff policies 203, are used as input to establish service rates and business rules 204 for operation. Any mediations 205, or changes to the established rates and business rules, are used to modify those rates and rules. The resulting rate is input into the billing system 206A, along with sales contract 202 information and tariff policy 203 information. When services 208 are rendered, the billing system 205 is referred to for rate information and, along with the customer profile/history 206, is used to generate bills 207. Information from such bills is used to update the customer profile/history 206 and is used to bill the customer for the rendered services 208.

As one skilled in the art will recognize, the billing component of FIG. 2 is used illustratively to show that numerous message exchanges are required between the various components of the OSS system, as well as between subcomponents of each of those components. The present inventors have recognized that one limitation with current OSS systems is that, in order to reconfigure an OSS, replace a subcomponent, or create new message flows between components, extensive testing and configuration control activities must occur. As discussed above in association with FIG. 1, this is primarily due to the fact that, currently, components and subcomponents of OSS systems typically consist of software applications that are designed to use a proprietary set of protocols and unique communication message formats to communicate with other specific applications in the OSS system. Such extensive testing and configuration control activities may require significant time and resources to accomplish.

Figure 3:
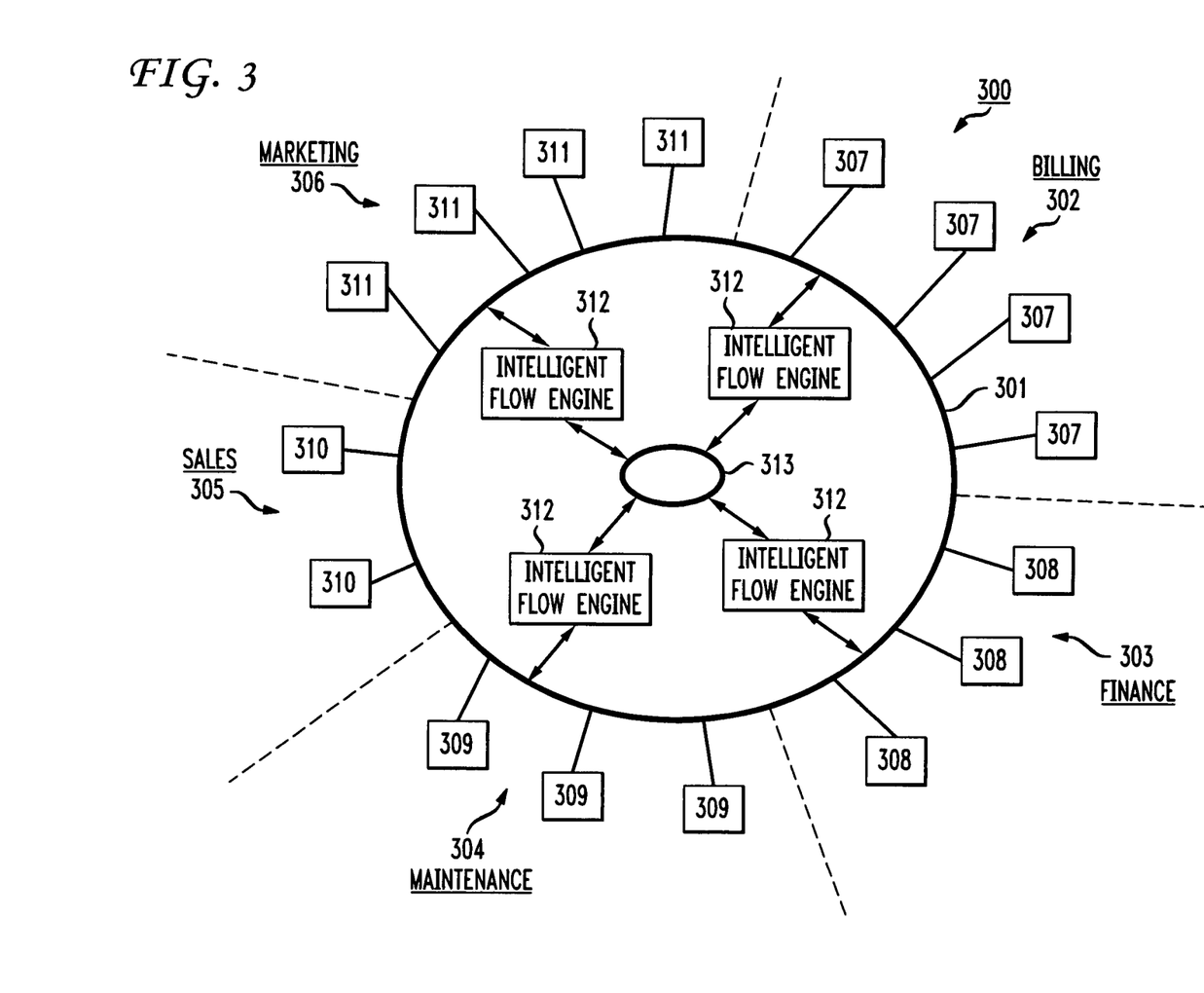
FIG. 3 shows an illustrative complex system, such as an operational support system, in accordance with an embodiment of the present invention.

Thus, the present inventors have invented a method and apparatus for performing the functions of a complex system, such as an OSS system, whereby the communications between applications performing the functions of the components of the system are coordinated by a translation and routing function in the network, hereinafter referred to as an Intelligent Flow Engine (IFE). As used herein, the term IFE is used to describe a computer-based component of a network that is adapted to perform routing functions and make decisions related to the flow of messages and data between other components of the network. As one skilled in the art will recognize, and as discussed further herein below, such an IFE may be either a stand-alone function or, alternatively, may be integrated with one or more components. FIG. 3 shows a complex system, illustratively an OSS system, in accordance with an embodiment of the present invention that uses such IFEs. Specifically, referring to that figure, system 300 has typical illustrative OSS components of Billing 302, Finance 303, Maintenance 304, Sales 305 and Marketing 306. In order to perform various tasks, for example, Billing function 302 has subcomponents 307; Finance function 303 has subcomponents 308; Maintenance function 304 has subcomponents 309; Sales function 305 has subcomponents 310; and Marketing function 306 has subcomponents 311. As discussed above, each of these subcomponents use software applications to perform various functions of the respective component. However, in the embodiment of FIG. 3, instead of components 302-306 and subcomponents 307-311 communicating directly to other components using proprietary protocols and interfaces, in accordance with the embodiment of FIG. 3, the subcomponents of each of the functions is connected to one or more IFEs 312 via network 301. Network 301 may be any type of well-known network suitable for transmitting messages between components, subcomponents and IFEs as described herein.

In accordance with this embodiment, the IFEs operate to collect and maintain information, such as state information, for each component and subcomponent of the system. This information is stored, for example, in a database that is either associated with a specific IFE or, alternatively, at a common database that can be accessed by all IFEs. For example, in order to collect such state information, when a component is first placed in operational use in a network, the device registers with one of the IFEs 312. This registration may include information such as which applications are provided and supported by the component, the type of application, whether each individual application is operational, and the specific functionality provided by each application. More particularly, for example, a billing component, such as the billing component of FIG. 2, may register with one of IFEs 312 and transmit state information to that IFE specifying that the billing component has operational billing applications, such as a bill generation application, service rate determination application, customer profile and history application as well as other applications. This state information may also include indications that each of those applications is operational and ready to receive message traffic. As applications are inserted or removed from the system, this registration information is updated so that the state and functionality of all applications in the network is stored at the IFEs 312. In one illustrative embodiment, if each IFE maintains its own separate database, the IFEs 312 may communicate state information about components in the network amongst themselves so that the database at each IFE has complete information concerning the operational components in the network. Such communication may be accomplished, for example, via well known multicasting techniques or individual discrete messages containing this state information may be sent to each IFE in the network separately.

Once all necessary applications in the system are registered with the IFEs, then message traffic may be initiated by coordination with the IFEs. As one skilled in the art will recognize, such communication between two applications is typically includes messages formatted with either common attributes or self attributes specific to each application. The term common attributes refers to elements of information that every application in the network may be capable of providing. Such common attribute information may include the state information associated with the application, status of the application, and information associated with other basic functions that are common across all applications in the network. Illustratively, all applications in the network are capable of requesting and sending information related to such attributes. On the other hand, the term self attributes refers to information that is exchanged in communication between two specific applications and not all components in the network. As one skilled in the art will recognize, these self attributes may include specific information that is exchanged in communications specifically between two components. Typically, common attributes may be used to establish a connection with a component, for example, via coordination with an IFE. Specific attributes may then be used for operational communications between those components once the connection is established. One skilled in the art will also recognize the operational communications using specific proprietary attributes may take place at a different layer in the network than the layer used to establish the connection using common attributes.

As discussed above, an IFE, such as one of IFEs 312 of FIG. 3, may coordinate the establishing of connections between components in the system. This coordination can include, for example, a component sending a message requesting a particular application or, alternatively, a message requesting or sending information to a particular application. These messages can be sent, for example, using one of a variety of well known protocols. In one illustrative embodiment, for example, the well-known Simple Object Access Protocol (SOAP) is used for such message exchanges.

According to such a protocol, a bind, pull, or push message can be used by the IFEs and the components to either bind one application to another or request or send information, respectively. The SOAP protocol is well known and will not be described further herein other than is necessary for an understanding of the principles of the present invention. For example, in accordance with another embodiment of the present invention, assume that an application at an OSS component, such as the Sales component, requires communication with another application at another OSS component, such as the service rate determination application at the billing component of FIG. 2. In order to initiate communication between the Sales component and the service rate determination application, the Sales component will first use a pull command to identify the applications that are available at the billing component. Then, the Sales component will send a bind request for communications with a service rate determination application to one of the IFEs. Since each of the IFEs maintain full state information, when one of the IFEs 312 receive this request the particular recipient IFE of the request from the Sales component determines an appropriate instance of that application (i.e., one that has available capacity or has specific desired application functionality) and transmits a bind command message to both the service rate determination application and the Sales component to bind the requesting Sales component with the service rate determination application. This bind command may contain, for example, the common and self attributes and formats that are required by each application. By binding each component or subcomponent with other components, the various necessary message flows can thus be established to create a fully functional OSS system. As one skilled in the art will recognize, a reverse procedure may be used to unbind two components in a system.

Figure 4:
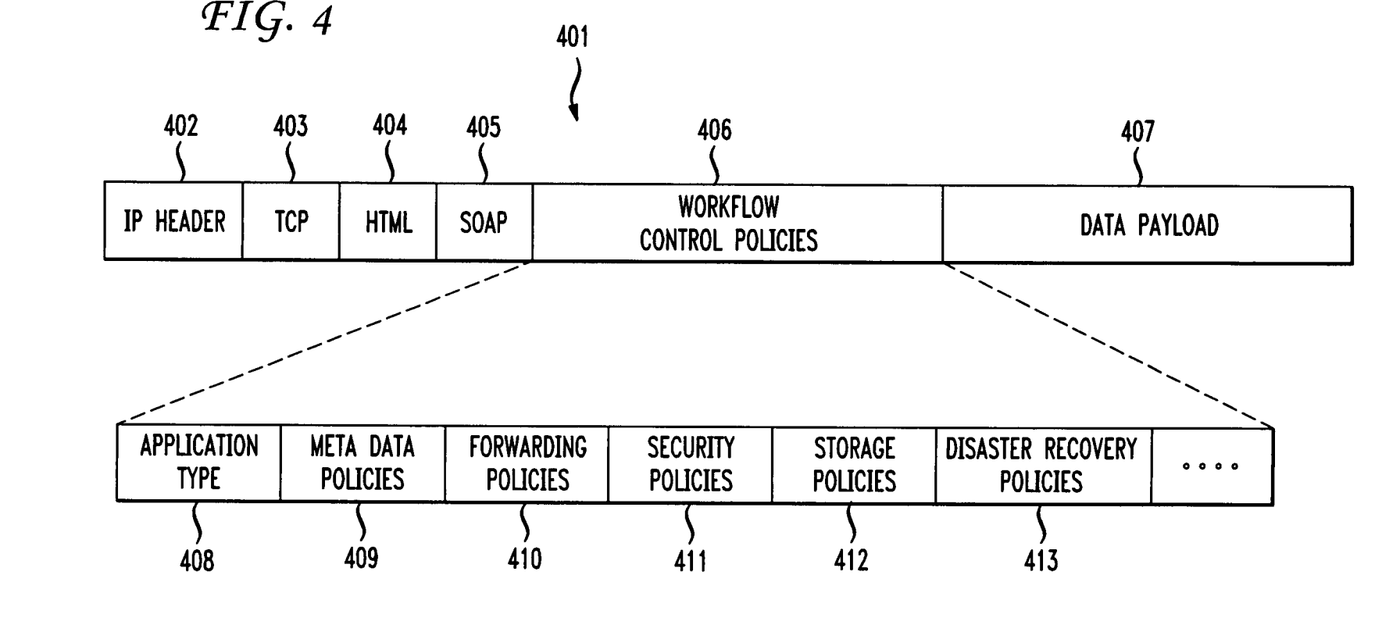
FIG. 4 shows an illustrative message format for communicating between the components and applications of the operational support system of FIG. 3.

Once two components are associated with each other according to the foregoing bind process, then message traffic may occur between those components. FIG. 4 shows a message format that may illustratively be used for the communication flows between two components in an OSS once registration has taken place via, for example, an IFE. Referring to that figure, message 401 has illustrative routing fields 402 (IP header) and 403 (TCP header). The message 401 also has, for example HTML field 404 and SOAP field 405 which are used, as discussed above, to carry various commands such as, for example, bind, push or pull commands to bind two components, transmit information to a component or request information from a component, respectively. Message 401 also has workflow control policies fields 406. These workflow policy fields are shown in expanded form in FIG. 4. For example, these fields may identify the application type 408 (e.g., sales, contract, billing, ordering, signaling, finance, etc). The workflow policy fields may also include data policy field 409 that identifies the type of data transmitted in the message; forwarding policy field 410 that specifies whether the message is to be multicast, the priority of the message, etc; security policy field 411 that identifies the authentication and/or encryption that is to be used for communications; storage policy field 412 that specifies whether stored data is to be synchronized with other components/IFEs as well as any acknowledgement (ACK) requirements for the message; and disaster recovery policies field 413 that, for example, identifies if the data is to be stored/backed up on the network to protect against any network failures. As one skilled in the art will recognize, the above message fields are merely illustrative in nature and that many different message formats and fields can be used to communication between components of an OSS system with equally advantageous results.

One skilled in the art will recognize that the above coordination provided by IFEs in accordance with the foregoing embodiments greatly increase the flexibility of a complex network, such as an OSS. For example, unlike prior OSSs, the components of the system do not have to be designed to communicate with specific applications (or specific instances of those applications) of the other components in the system. In fact, initially, each component of the OSS is not even required to know where message traffic is to be sent. Instead, each component of the OSS simply has to send a registration message to an IFE. The IFE then will identify the appropriate application, or instance of an application, to which the component should be bound and will then issue a bind command that will then bind that component to other components as necessary. Thus, if one component requires maintenance, the IFE can automatically switch the binding so that service is uninterrupted. Similarly, if a new component or new version of a component with, for example, upgraded or new applications, is entered into the network, it is simply a matter of connecting the new component to the network and registering the new component with an IFE. As discussed above, once this registration is complete, including the identification of the common and self attributes associated with the new component, then components can be bound to that new component and operational service can be initiated.

Figure 5:
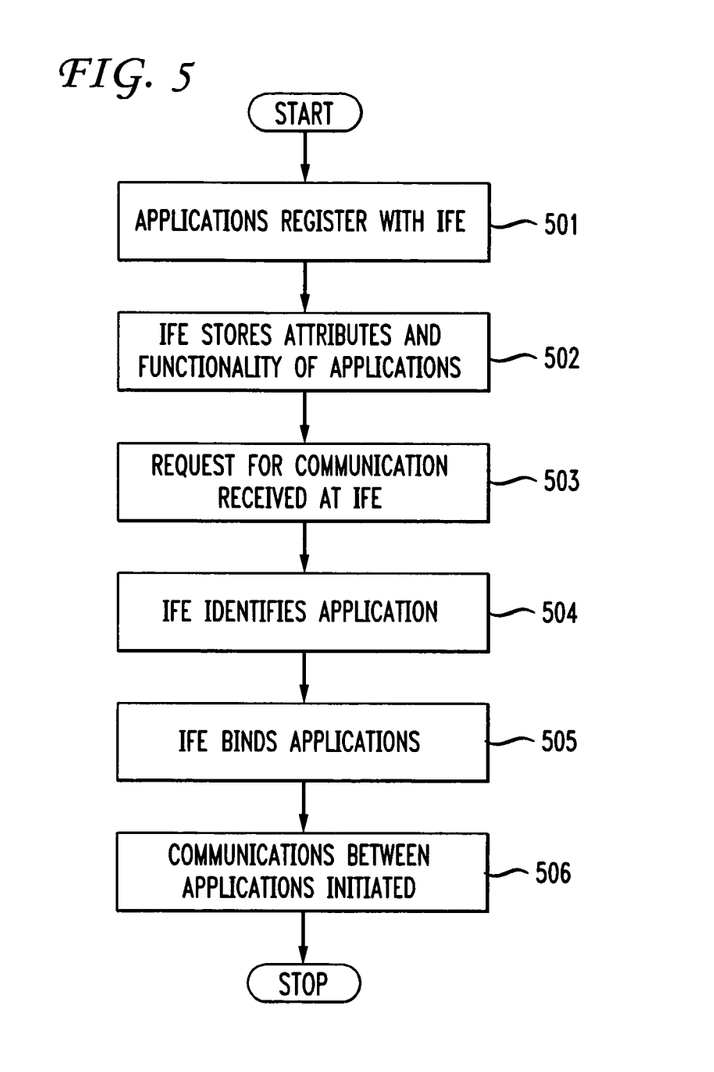
FIG. 5 is a flow chart showing the steps of a method in accordance with an embodiment of the present invention.

FIG. 5 is a flow chart showing the steps of a method in accordance with the foregoing embodiments of the present invention whereby an IFE is used to coordinate the communication flow between components in an OSS. Referring to that figure, at step 501, applications register with an IFE. At step 502, the IFE then stores the attributes and functionalities for each application. Then, at step 503, a request for communication with an application having a specific functionality is received at an IFE from a component in the OSS. Then, at step 504, the IFE identifies an appropriate application and, at step 505, binds that application with the requesting component/application. Finally, at step 506, communication between the bound components is initiated.

Figure 6:
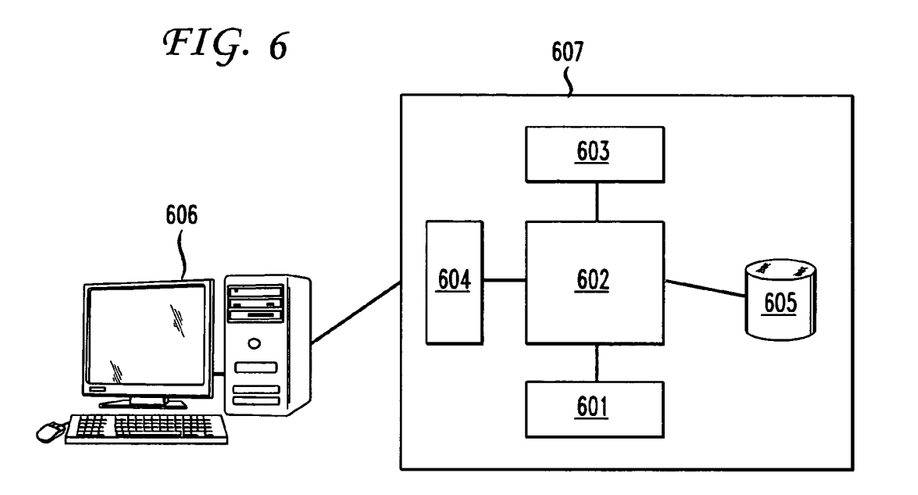
FIG. 6 is a block diagram of an illustrative programmable computer in accordance with an embodiment of the present invention.

FIG. 6 shows a block diagram of an illustrative IFE adapted to perform the functions described herein and, for example, the method of FIG. 5. Referring to that figure, a IFE 607 is implemented on a suitable computer adapted to receive, store and transmit messages and data such as the aforementioned registration messages and attribute data associated with components of an OSS. Specifically, illustrative IFE 607 may have, for example, a processor 602 (or multiple processors) which controls the overall operation of the IFE 607. Such operation is defined by computer program instructions stored in a memory 603 and executed by processor 602. The memory 603 may be any type of computer readable medium, including without limitation electronic, magnetic, or optical media. Further, while one memory unit 603 is shown in FIG. 6, it is to be understood that memory unit 603 could comprise multiple memory units, with such memory units comprising any type of memory. IFE 607 also comprises illustrative modem 601 and network interface 604. IFE 607 also illustratively comprises a storage medium, such as a computer hard disk drive 605 for storing, for example, data and computer programs adapted for use in accordance with the principles of the present invention as described hereinabove. Finally, IFE 607 also illustratively comprises one or more input/output devices, represented in FIG. 6 as terminal 606, for allowing interaction with, for example, a technician or database administrator. One skilled in the art will recognize that IFE 607 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for associating applications in a complex network, the network comprising a plurality of applications registered at a computer-based intelligent flow engine comprising a processor and a memory, the method comprising the steps of:
receiving at by the processor of the intelligent flow engine from a first application a request for a service;
identifying at by the processor of the intelligent flow engine a second application that is available to provide the service;
binding, by the processor of the intelligent flow engine, the second application to the first application; and
initiating communications between the first application and the second application.

2. The method of claim 1 wherein the complex network comprises an operational support system of a communication network.

3. The method of claim 2 wherein the first application is an application at a component in the operational support system.

4. The method of claim 3 wherein the component is one of an order management component, a design and engineering component, a service provisioning component, a service activation component, a carrier interconnection component, a billing component, an inventory component and a service assurance component.

5. The method of claim 1 further comprising, prior to said step of receiving:
receiving a registration request from a component in the network; and
registering the component at the intelligent flow engine.

6. The method of claim 1 further comprising:
in response to a need to remove said second application from operational service, unbinding the second application from the first application; and
binding the first application to a third application, the third application adapted to provide the service.

7. An apparatus for associating applications in a complex network, said network comprising a plurality of applications registered at an intelligent flow engine, the apparatus comprising:
means for receiving from a first application a request for a service;
means for identifying a second application that is available to provide the service;
means for binding the second application to the first application; and
means for initiating communications between the first application and the second application.

8. The apparatus of claim 7 wherein the complex network comprises an operational support system of a communication network.

9. The apparatus of claim 8 wherein the first application is an application at a component in the operational support system.

10. The apparatus of claim 9 wherein the component is one of an order management component, a design and engineering component, a service provisioning component, a service activation component, a carrier interconnection component, a billing component, an inventory component and a service assurance component.

11. The apparatus of claim 7 further comprising:
means for receiving a registration request from a component in the network; and
means for registering said component at the intelligent flow engine.

12. The apparatus of claim 7 further comprising:
means for unbinding the second application from the first application in response to a need to remove the second application from operational service; and
means for binding the first application to a third application, the third application adapted to provide the service.

13. A non-transitory computer readable medium storing computer program instructions which, when executed on a processor, define the steps of a method for associating applications in a complex network, the network comprising a plurality of applications registered at an intelligent flow engine, the computer program instructions comprising the steps of:
receiving from a first application a request for a service;
identifying a second application that is available to provide the service;
binding the second application to the first application; and
initiating communications between the first application and the second application.

14. The non-transitory computer readable medium of claim 13 wherein the complex network comprises an operational support system of a communication network.

15. The non-transitory computer readable medium of claim 14 wherein the first application is an application at a component in the operational support system.

16. The non-transitory computer readable medium of claim 15 wherein the component is one of an order management component, a design and engineering component, a service provisioning component, a service activation component, a carrier interconnection component, a billing component, an inventory component and a service assurance component.

17. The non-transitory computer readable medium of claim 13 further comprising computer program instructions which, when executed on a processor, define the steps of, prior to the step of receiving:
receiving a registration request from a component in the network; and
registering the component at the intelligent flow engine.

18. The non-transitory computer readable medium of claim 13 further comprising computer program instructions which, when executed on a processor, define the steps of:
in response to a need to remove the second application from operational service, unbinding the second application from the first application; and
binding the first application to a third application, the third application adapted to provide said service.

* * * * *

UNITED STATES PATENT AND TRADEMARK OFFICE
CERTIFICATE OF CORRECTION

PATENT NO.        : 8,763,007 B1
APPLICATION NO.   : 11/511676
DATED             : June 24, 2014
INVENTOR(S)       : Kaveh Hushyar et al.

Page 1 of 1

It is certified that error appears in the above-identified patent and that said Letters Patent is hereby corrected as shown below:

In the Claims

Claim 1, column 7, line 23, the text "receiving at by the processor" should read --receiving by the processor--

Claim 1, column 7, line 25, the text "identifying at by the processor" should read --identifying by the processor--

Signed and Sealed this
Twenty-third Day of September, 2014

Michelle K. Lee
*Deputy Director of the United States Patent and Trademark Office*